A. LEIGH.
Wheel-Cultivator.

No. 38,171.  Patented Apr 14, 1863.

Witnesses:
J. W. Coombs.
G. W. Reed

Inventor:
A. Leigh
per Munn & Co
Attys

UNITED STATES PATENT OFFICE.

ALFRED LEIGH, OF CLINTON STATION, NEW JERSEY.

IMPROVEMENT IN CULTIVATORS.

Specification forming part of Letters Patent No. 38,171, dated April 14, 1863.

*To all whom it may concern:*

Be it known that I, ALFRED LEIGH, of Clinton Station, in the county of Hunterdon and State of New Jersey, have invented a new and Improved Plow; and I do hereby declare that the following is a full, clear, and exact description of the same, reference being had to the accompanying drawings, forming a part of this specification, in which—

Figure 1:
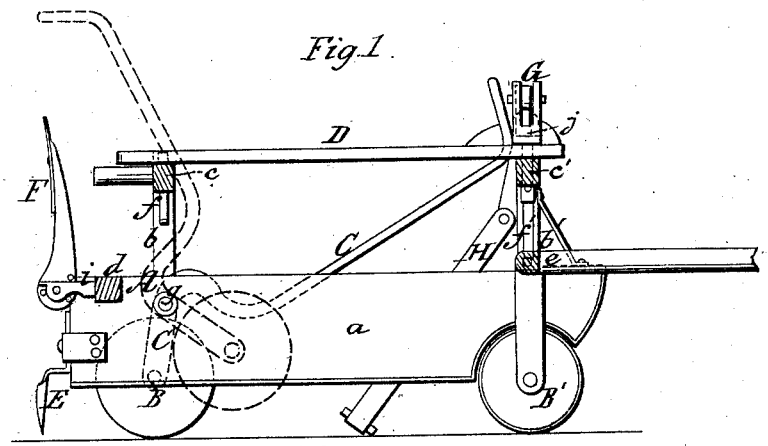
Figure 2:
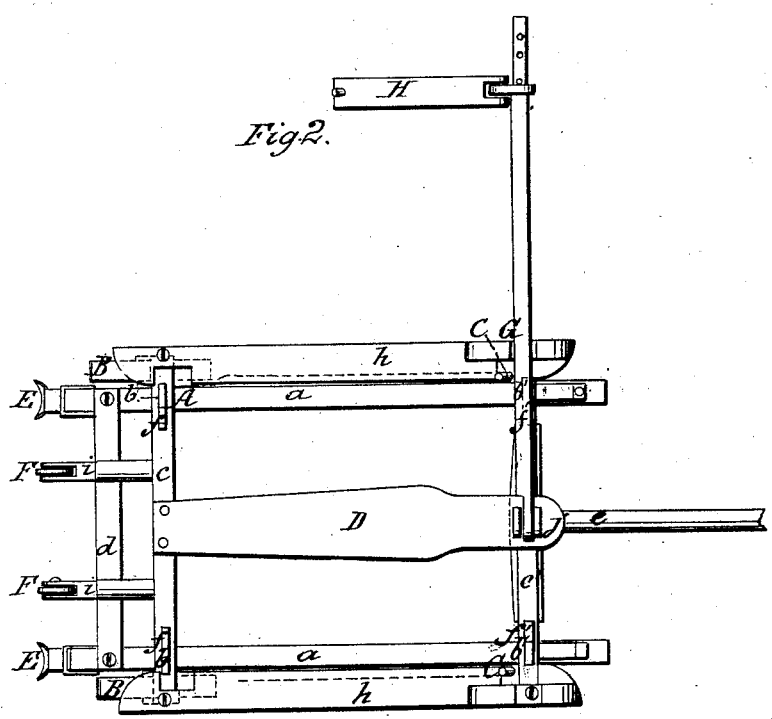

Figure 1 represents a longitudinal vertical section of my invention. Fig. 2 is a plan or top view of the same.

Similar letters of reference in both views indicate corresponding parts.

The object of this invention is to produce a plow which can be used with equal advantage for furrowing the ground before planting and for cultivating the growing crops.

The invention consists in the arrangement of a frame with four wheels and a draft-pole sufficiently elevated to pass over the growing plants, the hind wheels being hung on the ends of bent levers, so that by means of said levers the wheels can be moved up and down, and thereby the frame raised or lowered at pleasure for the purpose of regulating the depth of the furrows or throwing the plowshares out of the ground when it is desirable, the furrowing-shares being secured to the rear ends of the longitudinal timbers or beams of the frame, and the cultivating-shares being hinged to a cross-bar and arranged so that they can be turned up when not used and turned down when they are to be brought in action, the frame being provided with keys arranged in such a manner that by changing their position from one side of the uprights to the other the width of the frame is adjusted to different widths of furrows; and, furthermore, a swivel-arm carrying a marker is secured to the top of the frame for the purpose of guiding the plow in furrowing and to obtain furrows at uniform distances apart.

To enable those skilled in the art to make and use my invention, I will proceed to describe it with reference to the drawings.

A represents a frame, made of timber or other suitable material, and supported in front by two wheels, B', and in the rear by two wheels, B. This frame consists of two longitudinal beams, $a$, four uprights, $b\ b'$, connected by cross-bars $c\ c'$ and cross-bar $d$, and draft-pole $e$. The upper ends of the uprights $b\ b'$ are inserted into mortises in the cross-bars $c\ c'$ and held in place by keys or wedges $f\ f'$. By changing the position of these wedges from one side of the uprights to the other the width of the frame is changed according to the width of furrows to be drawn, said width being usually either three and half or four feet.

The draft-pole $e$ is elevated so that it passes over the growing plants, and it is hinged to the upright $b'$ over the front wheels. The keys $f'$ prevent it from moving laterally when the plow is adjusted to the widest furrows.

The hind wheels, B, are hung on the ends of bent levers C, which are fulcrumed on pivots $g$, and which extend up to the top of the frame, so that they can be operated from the driver's seat D. This seat is supported by the cross-bars $c\ c'$, and the levers C are held in the desired position by notched bars $h$, secured to the top of the frame A.

By throwing the levers C forward to the position shown in the drawings the frame A is raised from the ground, and by throwing said levers back the frame is lowered, and thereby the depth to which the plows penetrate the ground is regulated; or the plows can be thrown entirely out of the ground at pleasure.

E are the furrowing-shares, which are secured to the rear ends of the beams $a$; and F are the cultivator-teeth, which are hinged to standards $i$, inserted into the cross-bar $d$, as clearly shown in Fig. 1 of the drawings. By changing the position of these standards the cultivator-teeth are adjusted to the width of the furrows. When not used said teeth are turned up out of the way, and when they are to be brought in action they are turned down and secured in the desired position by wooden pins bearing against lips on the ends of the standards, said pins being so arranged that they will break when the teeth run against an obstruction, and damage to the teeth or other parts of the plow is prevented.

G is a swivel-bar hinged to the swivel $j$, which turns in the front cross-bar, $c'$, of the frame A. Suspended from the loose end of the swivel-bar is the marker H, and on starting the plow for a new furrow this marker drags in the furrow previously drawn, so that all the furrows become perfectly parallel and at uniform distances apart. When not used the swivel-bar, with the marker, is turned back and placed on the frame A.

The operation of this plow is very simple and easy, and the driver can regulate and govern the same entirely from his seat; or if he desires he can step down and govern the same by the handles projecting from the rear end of the frame A.

What I claim as new, and desire to secure by Letters Patent, is—

The arrangement of the frame A, with wheels B B', adjusting-levers C, furrowing-shares E, hinged cultivator-teeth F, and swivel-bar G, with marker H, all constructed and operating in the manner and for the purpose herein shown and described.

. ALFRED LEIGH.

Witnesses:
 N. W. CRAFT,
 SILVESTER REED.